(12) United States Patent
Choi et al.

(10) Patent No.: US 8,290,221 B2
(45) Date of Patent: Oct. 16, 2012

(54) APPARATUS AND METHOD FOR POLYNOMIAL RECONSTRUCTION IN FUZZY VAULT SYSTEM

(75) Inventors: Wooyong Choi, Daejeon (KR); Kiyoung Moon, Daejeon (KR); Sungju Lee, Chungnam (KR); Yongwha Chung, Chungnam (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 988 days.

(21) Appl. No.: 12/325,788

(22) Filed: Dec. 1, 2008

(65) Prior Publication Data

US 2009/0262990 A1 Oct. 22, 2009

(30) Foreign Application Priority Data

Apr. 17, 2008 (KR) .................. 10-2008-0035603

(51) Int. Cl.
 *G06K 9/00* (2006.01)
(52) U.S. Cl. .................. 382/125; 340/5.83; 380/28
(58) Field of Classification Search .......... 382/124–127; 340/5.53, 5.83; 380/28
See application file for complete search history.

(56) References Cited

U.S. PATENT DOCUMENTS

2008/0013804 A1* 1/2008 Moon et al. .................. 382/124

FOREIGN PATENT DOCUMENTS

| JP | 6-60168 | 3/1994 |
| KR | 1995-0007882 | 1/1993 |
| WO | WO 2008069475 A1 * | 6/2008 |

OTHER PUBLICATIONS

Juels et al. "A Fuzzy Vault Scheme." Proceedings, IEEE International Symposium on Information Theory, 2002, p. 408.*
Moon et al. "Implementation of Automatic Fuzzy Fingerprint Vault." Proceedings of the International Conference on Machine Learning and Cybernetics, vol. 7, Jul. 12, 2008, pp. 3781-3786.*
Yang et al. "Automatic Secure Fingerprint Verification System Based on Fuzzy Vault Scheme." IEEE International Conference on Acoustics, Speech and Signal Processing, vol. 5, Mar. 17, 2005, pp. v-609-v-612.*
Jeffers et al. "Minutiae-Based Structures for Fuzzy Vault." Special Session on Research at the Biometrics Symposium, Biometric Consortium Conference, Aug. 21, 2006, pp. 1-6.*
Chung, Yongwha et al., "Automatic Alignment of Fingerprint Features for Fuzzy Fingerprint Vault," *Lecture Notes in Computer Science*, vol. 3822:358-369 (2005).
Nandakumar, Karthik et al., "Fingerprint-based Fuzzy Vault: Implementation and Performance," *IEEE Transactions on Information Forensics and Security*, vol. 2(4):744-757 (2007).
Uludag, Umut et al., "Fuzzy Vault for Fingerprints," *Lecture Notes in Computer Science*, vol. 3546:310-319 (2005).

* cited by examiner

*Primary Examiner* — Jon Chang
(74) *Attorney, Agent, or Firm* — Nelson Mullins Riley & Scarborough LLP; EuiHoon Lee, Esq.

(57) ABSTRACT

Provided is a method for polynomial reconstruction in a fuzzy vault system, which includes receiving a set of matching minutiae to select a minutiae combination to be used for the polynomial reconstruction; generating simultaneous equations using the selected minutiae combination; determining whether a root of the simultaneous equations exists; and reconstructing the polynomial using the selected minutiae combination when the root of the simultaneous equations exists. The high-speed processing polynomial reconstruction method may perform polynomial reconstruction in real time, without using a separate key of a user, and thus may be applicable to various types of fuzzy vault systems.

8 Claims, 5 Drawing Sheets

FIG.4

NUMBER OF MATCHING MINUTIAE (UNIT: NUMBER)

| | GENUINE MATCHING | IMPOSTER MATCHING |
|---|---|---|
| NUMBER OF MATCHING MINUTIAE (T) | 18.33 | 9.49 |
| NUMBER OF REAL POINTS | 17.14 | 3.22 |
| NUMBER OF CHAFF POINTS | 1.19 | 6.27 |

FIG.5

COMPARISON OF ERROR RATE (UNIT: %)

| POLYNOMIAL DEGREE (K-1) | BRUTE-FORCE SEARCH | | PROPOSED SCHEME | |
| --- | --- | --- | --- | --- |
| | FRR | FAR | FRR | FAR |
| 7 | 10.0 | 5.6 | 12.7 | 2.7 |
| 8 | 12.7 | 2.7 | 15.5 | 1.4 |
| 9 | 15.5 | 1.4 | 19.1 | 0.6 |

FIG.6

COMPARISON OF POLYNOMIAL RECONSTRUCTION TIME (UNIT: SECOND)

| POLYNOMIAL DEGREE (K-1) | BRUTE-FORCE SEARCH | | PROPOSED SCHEME | |
| --- | --- | --- | --- | --- |
| | GENUINE MATCHING | IMPOSTER MATCHING | GENUINE MATCHING | IMPOSTER MATCHING |
| 7 | 4.7 | 0.031 | 0.015 | 0.000 |
| 8 | 44.6 | 0.051 | 0.064 | 0.000 |
| 9 | 390.3 | 0.077 | 0.256 | 0.000 |

APPARATUS AND METHOD FOR POLYNOMIAL RECONSTRUCTION IN FUZZY VAULT SYSTEM

RELATED APPLICATIONS

The present application claims priority to Korean Patent Application Serial Number 10-2008-0035603, filed on Apr. 17, 2008, the entirety of which is hereby incorporated by reference.

BACKGROUND OF THE INVENTION

1. Field of the Invention

The present invention relates to an apparatus and method for polynomial reconstruction in a fuzzy vault system, and more particularly, to an apparatus and method for reconstructing a polynomial from matching minutiae in a fuzzy vault system.

This work was supported by the IT R&D program of MIC/IITA [2007-S-020-02, Development of Privacy Enhanced Biometric System].

2. Description of the Related Art

As global networks using the Internet are formed in this information-oriented society, it is easier to collect, analyze, and process important personal information which results in causing serious problems such as surreptitious use or destruction of the personal information by another party. Currently, a widely used user authentication scheme using a user password or personal identification number (PIN) may not safely keep important information. In order to solve the above problem, a biometric-based technology is becoming popular. The biometric-based technology identifies a user using unique biometric information of the user such as fingerprints, voice, face, iris, and the like. In aspects that, in comparison to the user password or the PIN, the biometric-based technology has the less probability to be surreptitiously used by another party and the user does not need to memorize it, the biometric-based technology may provide both user convenience and safe security at the same time.

A user authentication system using the biometric-based technology may automatically identify the user based on physical or behavioral features of the user. Further, in an aspect that it is possible to prevent illegal use of or illegal access to an automated teller machine (ATM), a mobile phone, a smart card, a desktop PC, a workstation, and a computer network, many attentions are being paid on the user authentication system as a substitute of the PIN or the password.

However, when biometric information stored for the user authentication is surreptitiously used by another party, it may not be changed or limitedly changed. This is different from the password or the PIN. Thus, serious problems may arise. Specifically, there is a need for a method that may securely and safely store or transmit biometric information.

Researches are being actively conducted on bonding a biometric concept and a fuzzy vault concept that has been widely discussed in the existing encoding field. For example, a research of applying the fuzzy vault concept to a fingerprint recognition is being made.

In order to authenticate a user in the fingerprint fuzzy vault, a process of reconstructing a polynomial using minutiae extracted from a fingerprint is required. In order to reconstruct the polynomial, a process of selecting a real point from the extracted minutiae to thereby reconstruct the polynomial is required. However, when applying, to the fuzzy vault, a Reed-Solomon (RS) code scheme that is generally mentioned as a conventional scheme of selecting the real point, many difficulties may be found. Also, a large number of real points may be required. Accordingly, most conventional fingerprint fuzzy vault researches omit the process of reconstructing the polynomial from matching minutiae, or are dependent on a brute-force search of performing Lagrange interpolation for all the possible minutiae combinations. However, due to a significantly large amount of calculation, the brute-force search may not be embodied in real time. Accordingly, although the polynomial reconstruction is an essential process in the fingerprint recognition system using the fingerprint fuzzy vault, the existing fingerprint fuzzy vault system is dependent on only the brute-force search and thus cannot process the polynomial reconstruction in real time.

In order to solve the above problem, a method of selecting only a real point from matching minutiae is proposed, but a user needs to carry a separate key.

SUMMARY OF THE INVENTION

The present invention has been finalized in order to solve the above-described, problems. Thus, an exemplary embodiment of the present invention provides an apparatus and method for polynomial reconstruction in a fuzzy vault system that may not perform polynomial reconstruction when a chaff point is included in minutiae selected for the polynomial reconstruction and may improve a polynomial reconstruction speed using consistency theorem and a recursive scheme in order to determine whether the chaff point is included. Also, an exemplary embodiment of the present invention provides an apparatus and method for polynomial reconstruction that may perform polynomial reconstruction in real time using a high speed processing polynomial reconstruction method, without using a separate key of a user.

According to an embodiment of the present invention, there is provided an apparatus for polynomial reconstruction in a fuzzy vault system, which includes a minutiae selection unit receiving a set of matching minutiae to select a minutiae combination to be used for the polynomial reconstruction; a simultaneous equations generation unit generating simultaneous equations using the selected minutiae combination; a root decision unit determining whether a root of the simultaneous equations exists; and a reconstruction unit reconstructing the polynomial using the selected minutiae combination when the root of the simultaneous equations exists.

In this instance, when the root of the simultaneous equations does not exist, the minutiae selection unit may reselect a minutiae combination to be used for the polynomial reconstruction.

Also, when selecting the minutiae combination to be used for the polynomial reconstruction, the minutiae selection unit may select the minutiae combination to have a larger number of minutiae than a degree of the polynomial by two.

Also, the root decision unit may generate an augmented matrix of the simultaneous equations and convert the augmented matrix to a row echelon form matrix to determine whether the root of the simultaneous equations exists based on a value of the last element of the last row of the row echelon form matrix.

According to another embodiment of the present invention, there is provided a method for polynomial reconstruction in a fuzzy vault system, which includes receiving a set of matching minutiae to select a minutiae combination to be used for the polynomial reconstruction; generating simultaneous equations using the selected minutiae combination; determining whether a root of the simultaneous equations exists;

and reconstructing the polynomial using the selected minutiae combination when the root of the simultaneous equations exists.

In this instance, the method may further include reselecting a minutiae combination to be used for the polynomial reconstruction, when the root of the simultaneous equations does not exist.

Also, when selecting the minutiae combination to be used for the polynomial reconstruction, the selecting of the minutiae combination may select the minutiae combination to have a larger number of minutiae than a degree of the polynomial by two.

Also, the determination may generate an augmented matrix of the simultaneous equations and convert the augmented matrix to a row echelon form matrix to determine whether the root of the simultaneous equations exists based on a value of the last element of the last row of the row echelon form matrix.

According to exemplary embodiments of the present invention, there may be provided a high-speed processing polynomial reconstruction method that may perform polynomial reconstruction in real time, without using a separate key of a user, and thus may be applicable to various types of fuzzy vault systems.

DESCRIPTION OF THE PREFERRED EMBODIMENTS

Hereinafter, the present invention will be described in detail with reference to the accompanying figures. When it is determined the detailed description related to a related known function or configuration they may make the purpose of the present invention unnecessarily ambiguous in describing the present invention, the detailed description will be omitted here. Exemplary embodiments are provided so that those skilled in the art may more completely understand the present invention. Accordingly, the shape, the size, etc., of elements in the figures may be exaggerated for explicit comprehension. Like reference numerals refer to the like elements throughout.

Hereinafter, an example of applying, to a fingerprint fuzzy vault system, an apparatus for polynomial reconstruction according to an exemplary embodiment of the present invention will be described. However, the polynomial reconstruction apparatus is not limited to only the fingerprint fuzzy vault system and thus it will be apparent to those skilled in the art that the polynomial reconstruction apparatus may be applicable to various types of fuzzy vault systems.

Figure 1:
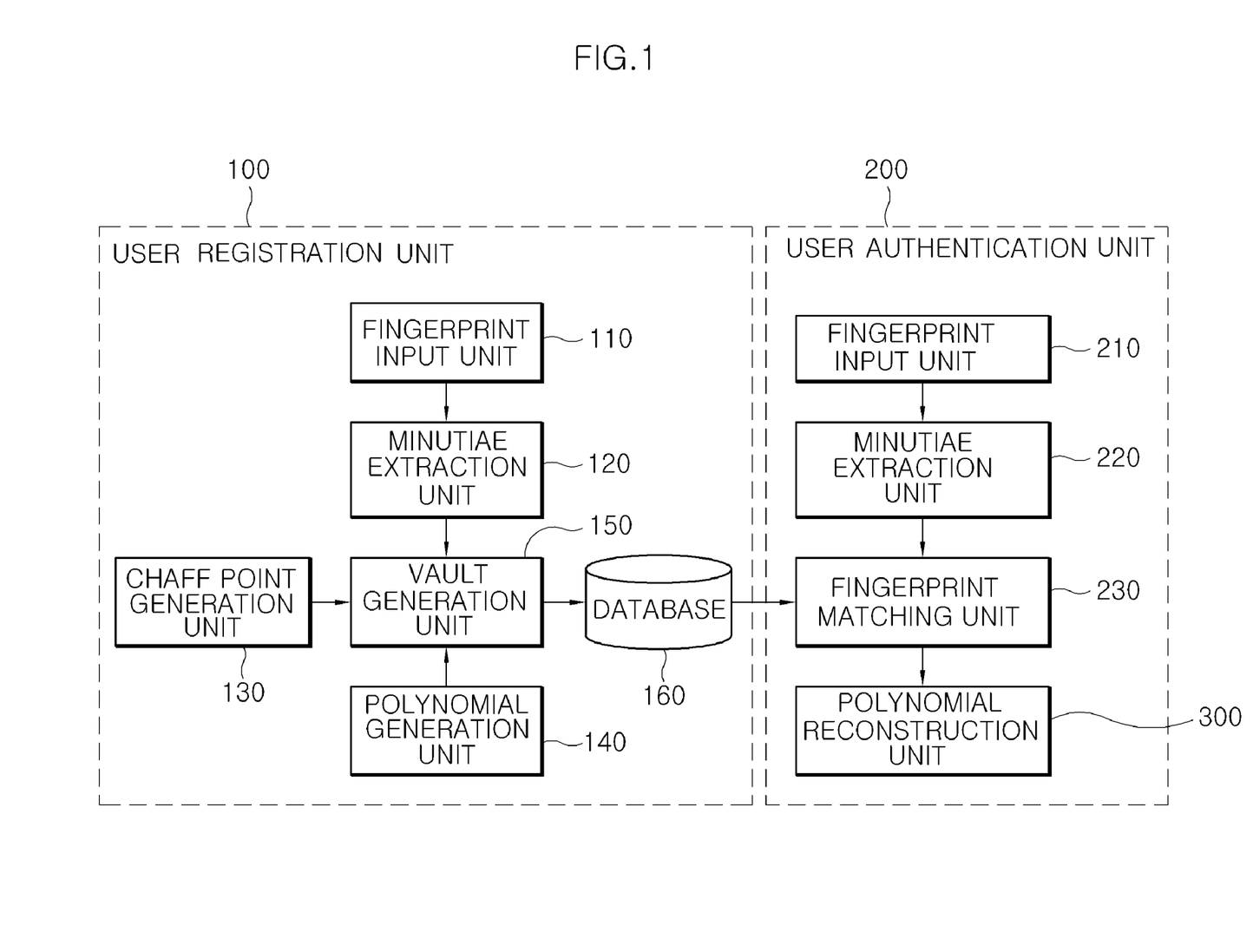
FIG. 1 is a block diagram for describing a fingerprint fuzzy vault system adopting a polynomial reconstruction apparatus according to an exemplary embodiment of the present invention.

FIG. 1 is a block diagram for describing a fingerprint fuzzy vault system adopting a polynomial reconstruction apparatus according to an exemplary embodiment of the present invention.

The fingerprint fuzzy vault system adopting the polynomial reconstruction apparatus includes a user registration unit 100 performing an encoding process of fingerprint fuzzy vault and a user authentication unit 200 performing a decoding process thereof.

The user registration unit 100 functions to extract fingerprint minutiae of a user and generate a chaff point to thereby construct a vault. The user registration unit 100 includes: a fingerprint input unit 110 receiving a fingerprint image; a minutiae extraction unit 120 extracting minutiae from the fingerprint image input via the fingerprint input unit 110; a chaff point generation unit 130 generating a chaff point; a polynomial generation unit 140 generating a polynomial having a finite field element as a coefficient; a vault generation unit 150 mapping a real point to a point on the polynomial and the chaff point to a point off the polynomial to thereby generate a vault; and a database 160 storing the generated vault.

The user authentication unit 200 functions to extract the fingerprint minutiae of the user and match the extracted minutiae with the stored vault to thereby reconstruct the polynomial. The user authentication unit 200 includes: a fingerprint input unit 210 receiving a fingerprint image; a minutiae extraction unit 220 extracting minutiae from the fingerprint image input via the fingerprint input unit 210; a fingerprint matching unit 230 comparing the minutiae extracted via the minutiae extraction unit 220 and the vault stored in the database 160 to acquire matching minutiae; and a polynomial reconstruction unit 300 reconstructing the polynomial from the matching minutiae.

Hereinafter, a configuration of the user registration unit 100 will be described in detail.

The finger input unit 110 functions to receive a fingerprint image from a user in order to register the fingerprint of the user. The minutiae extraction unit 120 functions to extract minutiae from the fingerprint image input via the fingerprint input unit 110. The minutiae may be an end point, a bifurcation, singular points, and the like that ridges make in the fingerprint image. Additional information such as entire ridge information may be used.

The polynomial generation unit 140 functions to generate the polynomial having coefficients, for example, (k−1) degree polynomial and to acquire a secret value h(k) using a pre-stored hash function h.

The chaff point generation unit 130 functions to generate chaff points. The chaff points may be used to hide the polynomial generated by the polynomial generation unit 140 and thereby improve the security of an algorithm.

The vault generation unit 150 functions to map real points to points existing on the polynomial generated by the polynomial generation unit 140 and to map the chaff points to points not existing on the polynomial generated by the polynomial generation unit 140, using the minutiae extracted by the minutiae extraction unit 120. The vault generation unit 150 may generate the vault using the mapping minutiae, the hash function h, the secret value h(k), and the polynomial degree, for example, 'k−1' degree.

The database 160 functions to store the vault generated by the vault generation unit 150.

Hereinafter, a configuration of the user authentication unit 200 will be described in detail.

Like the fingerprint input unit 210 of the user registration unit 100, the fingerprint input unit 210 functions to receive the fingerprint image from the user for user authentication.

Also, like the minutiae extraction unit 120 of the user registration unit 100, the minutiae extraction unit 220 functions to extract minutiae from the fingerprint image input via the minutiae input unit 210. In FIG. 1, the fingerprint input unit 110 included in the user registration unit 100 is separately provided from the fingerprint input unit 210 included in the user authentication unit 200, but they may be physically integrated into a single configuration.

The fingerprint matching unit 230 functions to compare the minutiae extracted from the minutiae extraction unit 220 with the vault stored in the database 160 to acquire matching minutiae (hereinafter, referred to as a "set M").

The polynomial reconstruction unit 300 functions to reconstruct the polynomial using the set M. When the polynomial reconstruction unit 300 reconstructs the polynomial, many matching points may exist between the minutiae extracted by the minutiae extraction unit 220 of the user authentication unit 200 and the minutiae extracted by the minutiae extraction unit 120 of the user registration unit 100. In this case, the polynomial reconstruction unit 300 may identify most real points existing on the polynomial and thus may easily reconstruct the polynomial.

Figure 2:
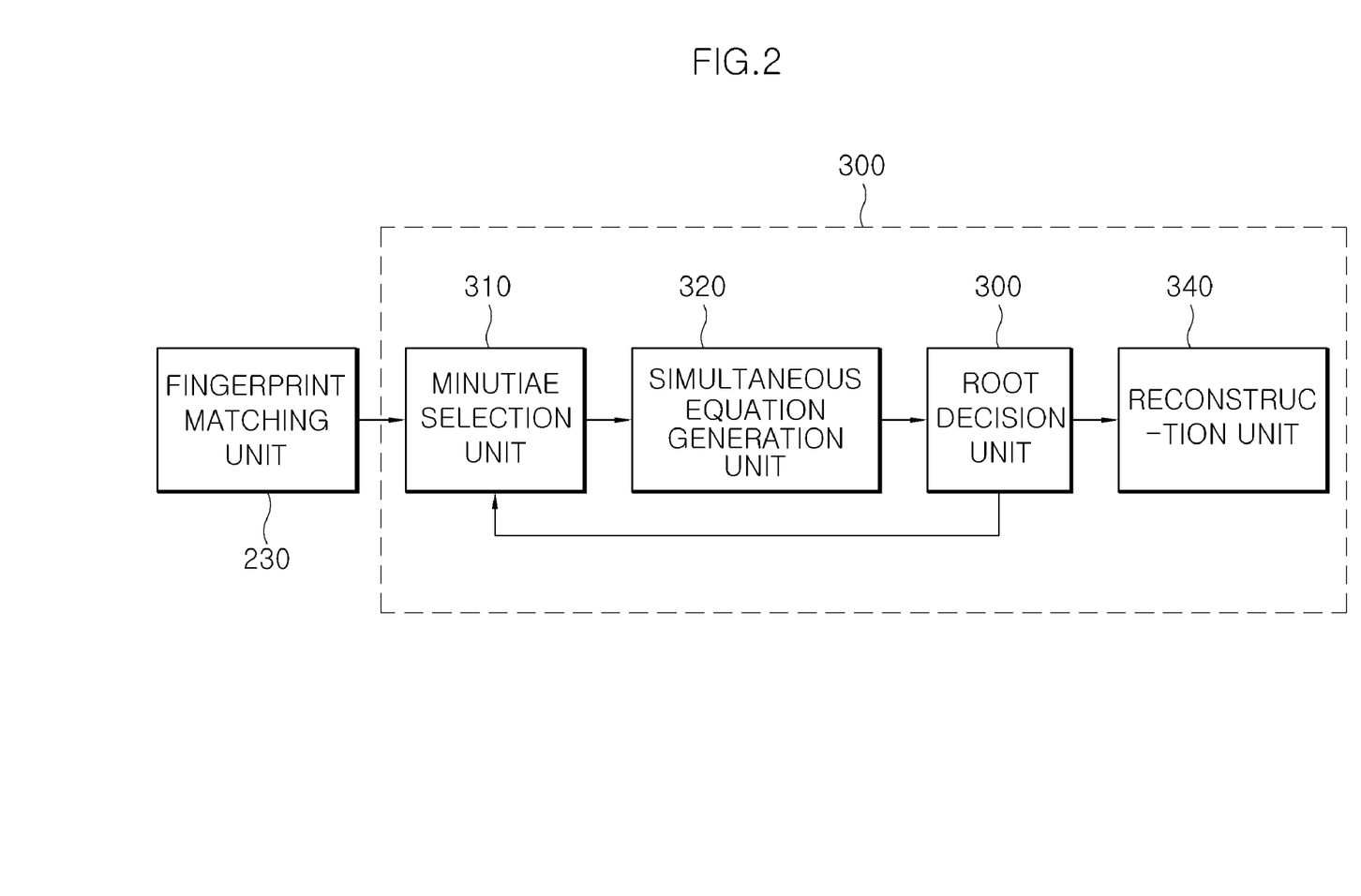
FIG. 2 is a detailed block diagram for describing a polynomial reconstruction procedure in a polynomial reconstruction unit shown in FIG. 1.

FIG. 2 is a detailed block diagram for describing a polynomial reconstruction procedure in the polynomial reconstruction unit 300 of FIG. 1.

Here, the polynomial reconstruction unit 300 corresponds to a polynomial reconstruction apparatus in a fuzzy vault system according to the present invention.

The polynomial reconstruction unit 300 includes a minutiae selection unit 310, a simultaneous equations generation unit 320, a root decision unit 330, and a reconstruction unit 340.

The minutiae selection unit 310 functions to receive a "set M" from the fingerprint matching unit 230 to select a minutiae combination for the polynomial reconstruction. In this instance, the minutiae may be selected more than a degree of the polynomial by two. For example, when the degree of polynomial generated by the polynomial generation unit 140 is k−1, the minutiae selection unit 310 may select (k+1) minutiae from the "set M" for the polynomial reconstruction.

The simultaneous equations generation unit 320 functions to substitute the polynomial with elements of the minutiae combination selected by the minutiae selection unit 310 to generate the simultaneous equation.

The root decision unit 330 functions to determine whether a root of the simultaneous equations generated by the simultaneous equations generation unit 320 exists. When the root of the simultaneous equations exists, the root decision unit 330 enables the reconstruction unit 340 to reconstruct the polynomial. Conversely, when the root of the simultaneous equations does not exist, the root decision unit 330 enables the minutiae selection unit 310 to reselect a minutiae combination for the polynomial reconstruction. When the root of the simultaneous equations does not exist, the minutiae selection unit 310 may reselect the minutiae combination for the polynomial reconstruction from the "set M".

The reconstruction unit 340 functions to reconstruct the polynomial using the minutiae combination selected by the minutiae selection unit 310, based on the decision result of the root decision unit 330. Specifically, when the root of the simultaneous equations generated by the simultaneous equations generation unit 320 exists, the reconstruction unit 340 may reconstruct the polynomial using the minutiae combination selected by the minutiae selection unit 310.

Hereinafter, a process where the root decision unit 330 determines whether the root of the simultaneous equations generated by the simultaneous equations generation unit 320 exists and a process where, when the root of the simultaneous equations exists, the reconstruction unit 340 reconstructs the polynomial using the minutiae combination selected by the minutiae selection unit 310 will be described in detail.

Conditions for a linear system to have the root may be expressed by the following Theorem 1:

(Theorem 1)

All the following prepositions with respect to the linear system Ax=b are equivalent.

(a) The root of Ax=b exists.

(b) b is an element included in a column space of A.

(c) Coefficient matrix A and augmented matrix [A|b] have the same rank.

The above theorem 1 may be induced to the following Corollary 1-1:

(Corollary 1-1)

When Ax=b is the linear system that includes (n+1) equations and n unknown quantities and in this instance the last row of row echelon form of the augmented matrix [A|b] is not a zero vector, the root of the linear system Ax=b does not exist.

Based on the aforementioned Corollary 1-1, the polynomial reconstruction by the polynomial reconstruction unit 300 may be considered to calculate the root of the linear system including t equations and k unknown quantities. Accordingly, the linear system may be given by the following Equation 1:

$$\begin{bmatrix} 1 & u_1 & u_1^2 & \ldots & u_1^{k-1} \\ 1 & u_2 & u_2^2 & \ldots & u_2^{k-1} \\ \vdots & \vdots & \vdots & & \vdots \\ 1 & u_t & u_t^2 & \ldots & u_t^{k-1} \end{bmatrix} \begin{bmatrix} a_0 \\ a_1 \\ \vdots \\ a_{k-1} \end{bmatrix} = \begin{bmatrix} v_1 \\ v_2 \\ \vdots \\ v_t \end{bmatrix}_{u_i \neq u_j, \forall i \neq j}$$ [Equation 1]

When selecting (k+1) rows from the above Equation 1 to construct the augmented matrix, it may be expressed by the following Equation 2:

$$\begin{bmatrix} 1 & u_1 & u_1^2 & \ldots & u_1^{k-1} & v_1 \\ 1 & u_2 & u_2^2 & \ldots & u_2^{k-1} & v_2 \\ \vdots & \vdots & \vdots & & \vdots & \vdots \\ 1 & u_{k+1} & u_{k+1}^2 & \ldots & u_{k+1}^{k-1} & v_{k+1} \end{bmatrix}$$ [Equation 2]

When converting the above augmented matrix to the row echelon-form, it may be expressed by the following Equation 3:

$$\begin{bmatrix} 1 & u_1 & u_1^2 & \ldots & u_1^{k-1} & v_1^{(1)} \\ 0 & 1 & u_2^{2(2)} & \ldots & u_2^{k-1(2)} & v_2^{(2)} \\ \vdots & \vdots & \vdots & & \vdots & \vdots \\ 0 & 0 & 0 & \ldots & 1 & v_k^{(k)} \\ 0 & 0 & 0 & \ldots & 0 & v_{k+1}^{(k+1)} \end{bmatrix}$$ [Equation 3]

where $u_j^{i(l)}$ and $v_j^{(l)}$ denote $u_j^i$ and $b_j$ when a $j^{th}$ row has leading 1 in an $l^{th}$ element, respectively. Here, an operation of changing two rows is not performed.

When $v_{k+1}^{(k+1)} \neq 0$, the linear system expressed by the above Equation 2 according to Corollary 1-1 does not have the root. Specifically, $(u_1, v_1), \ldots, (u_{k+1}, v_{k+1})$ includes at least one chaff point and thus the polynomial may not be reconstructed.

Conversely, when $v_{k+1}^{(k+1)} = 0$, all the selected (k+1) minutiae may be real points and thus the polynomial may be constructed using k minutiae $(u_1,v_1), \ldots, (u_k,v_k)$. Next, the reconstructed polynomial may be compared with a polynomial having a coefficient, generated by the polynomial generation unit 140, to thereby perform user authentication.

When considering the linear system of the above Equation 1 having t equations, the augmented matrix may be expressed by the following Equation 4:

$$\begin{bmatrix} 1 & u_1 & u_1^2 & \ldots & u_1^{k-1} & v_1 \\ 1 & u_2 & u_2^2 & \ldots & u_2^{k-1} & v_2 \\ \vdots & \vdots & \vdots & & \vdots & \vdots \\ 1 & u_t & u_t^2 & \ldots & u_t^{k-1} & v_t \end{bmatrix}. \quad \text{[Equation 4]}$$

The row echelon form of this matrix may be expressed by the following Equation 5:

$$\begin{bmatrix} 1 & u_1 & u_1^2 & \ldots & u_1^{k-1} & v_1^{(1)} \\ 0 & 1 & u_2^{2(2)} & \ldots & u_2^{k-1(2)} & v_2^{(2)} \\ \vdots & \vdots & \vdots & & \vdots & \vdots \\ 0 & 0 & 0 & \ldots & 1 & v_k^{(k)} \\ 0 & 0 & 0 & \ldots & 0 & v_{k+1}^{(k+1)} \\ \vdots & \vdots & \vdots & & \vdots & \vdots \\ 0 & 0 & 0 & \ldots & 0 & v_t^{(k+1)} \end{bmatrix}. \quad \text{[Equation 5]}$$

When all of $v_{k+1}^{(k+1)}, v_{k+2}^{(k+1)}, \ldots, v_t^{(k+1)}$ is not zero, $(u_1,v_1), \ldots, (u_k,v_k)$ includes at least one chaff point. Accordingly, in this case, the polynomial reconstruction is not performed. However, when at least one of $v_{k+1}^{(k+1)}, v_{k+2}^{(k+1)}, \ldots, v_t^{(k+1)}$ includes zero, all of $(u_1,v_1), \ldots, (u_k,v_k)$ may be real points and thus the polynomial may be reconstructed by using $(u_1,v_1), \ldots, (u_k,v_k)$.

In order to reconstruct the polynomial with respect to given t minutiae, this calculation may need to be performed with respect to $_tC_k$ of all the possible combinations. Accordingly, when t and k increases, a number of cases may geometrically increase. However, the augmented matrix of the above Equation 1 has a certain pattern such as 1 for a first column, u for a second column, $u^2$ for a third column, and the like. Accordingly, $v_j^{(k+1)}$ may be acquired by using the following recursive scheme as given by the following Equation 6:

$$v_j^{(i+1)} = \begin{cases} v_j, & i = 0 \\ \dfrac{v_j^{(i)} - v_i^{(i)}}{u_j - u_i}, & i = 1, \ldots, \min(k, j-1) \end{cases} \quad \text{[Equation 6]}$$

$$j = 1, \ldots, t$$

Accordingly, in comparison to a brute-force search scheme, a calculation time may be significantly reduced and a real-time processing may also be enabled.

Hereinafter, a method of reconstructing a polynomial from a set of matching minutiae, that is, a "set M" in a fuzzy vault system according to an exemplary embodiment of the present invention will be described with reference to FIG. 3.

Figure 3:
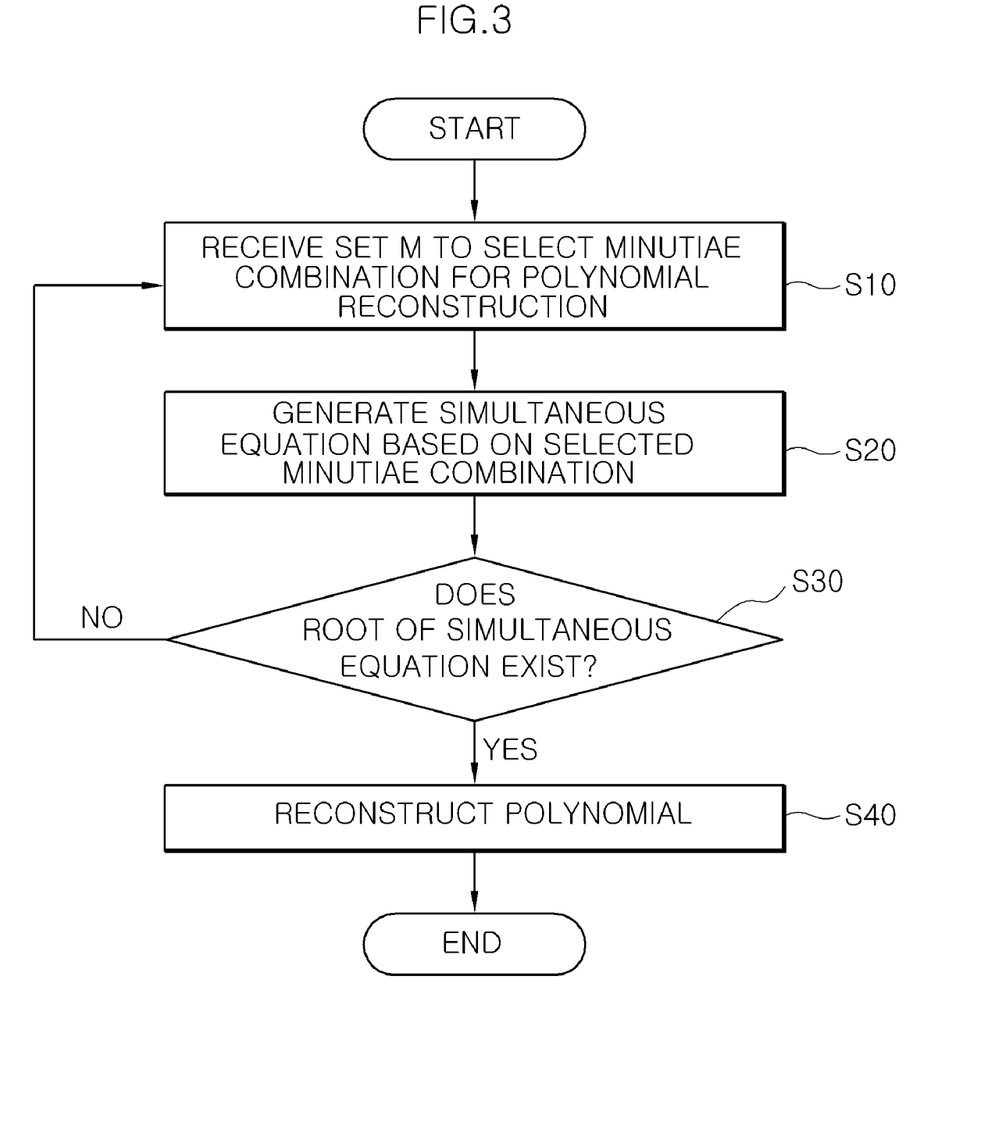
FIG. 3 is a flowchart for describing a method for polynomial reconstruction in a fuzzy vault system according to an exemplary embodiment of the present invention.

FIG. 3 is a flowchart for describing a method for polynomial reconstruction in a fuzzy vault system according to an exemplary embodiment of the present invention.

In operation S10, the polynomial reconstruction method receives a "set M" from the fingerprint matching unit 230 to select a minutiae combination for the polynomial reconstruction. In this instance, the minutiae may be selected more than a degree of the polynomial by two. For example, when the degree of polynomial generated by the polynomial generation unit 140 is k−1, (k+1) minutiae for the polynomial reconstruction may be selected from the "set M". In operation S20, the polynomial reconstruction method substitutes the polynomial with elements of the minutiae combination generated by the polynomial generation unit 140 to generate a simultaneous equation. In operation S30, the polynomial reconstruction method determines whether a root of the simultaneous equations exists. The process of determining whether the root of the simultaneous equations exists has been described in detail with reference to FIG. 2 and thus further detailed descriptions relate thereto will be omitted here.

When the root of the simultaneous equations exists, the polynomial reconstruction method reconstructs the polynomial using the elements of the selected minutiae combination in operation S40. Conversely, when the root of the simultaneous equations does not exist, the polynomial reconstruction method reselects a minutiae combination for the polynomial reconstruction from the "set M" and repeats the aforementioned process.

After operation S40, a secret value h(k') is acquired using the reconstructed polynomial. When the secret value h(k') is identical to a previous secret value h(k), a user authentication may be accepted. Otherwise, the user may be rejected. It will be readily configured by those skilled in the art and thus further detailed descriptions related thereto will be omitted here.

Figure 4:
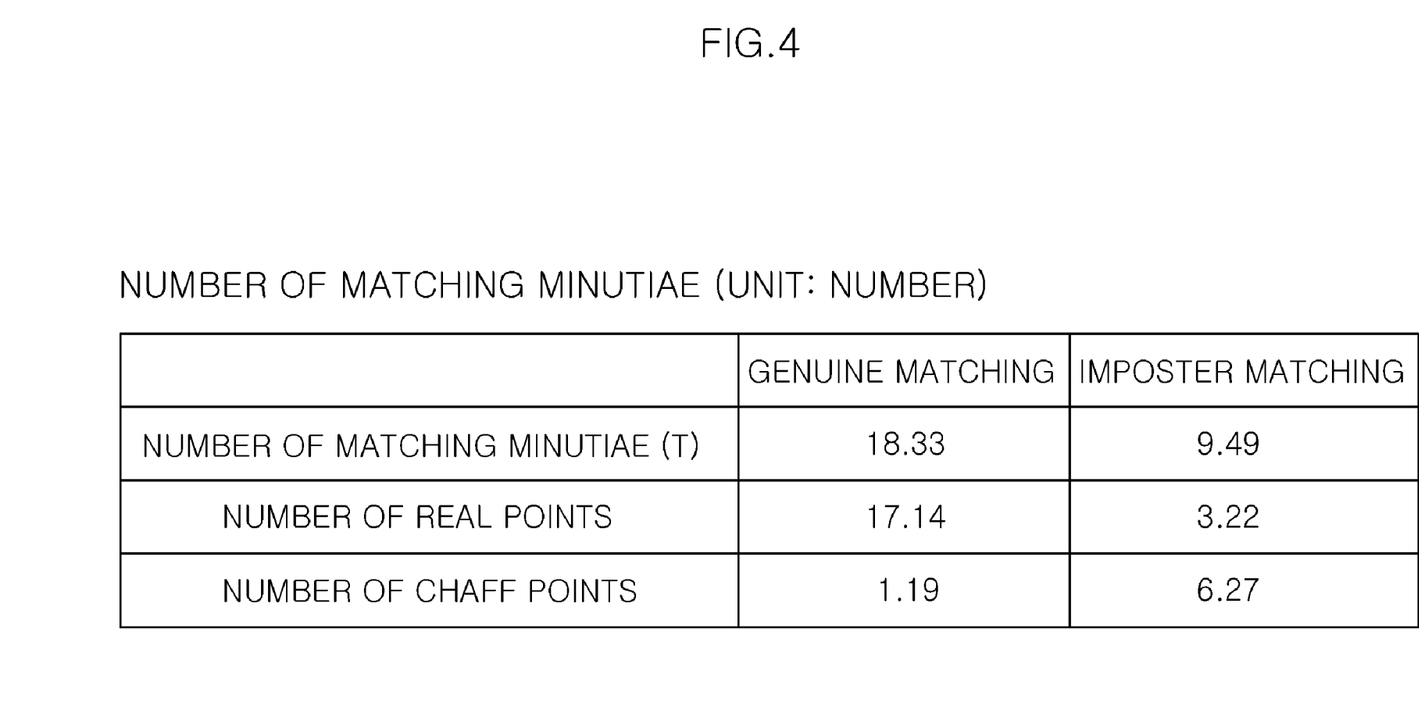
FIGS. 4 to 6 are tables for describing a performance of a method for polynomial reconstruction in a fuzzy vault system according to an exemplary embodiment of the present invention.
Figure 5:
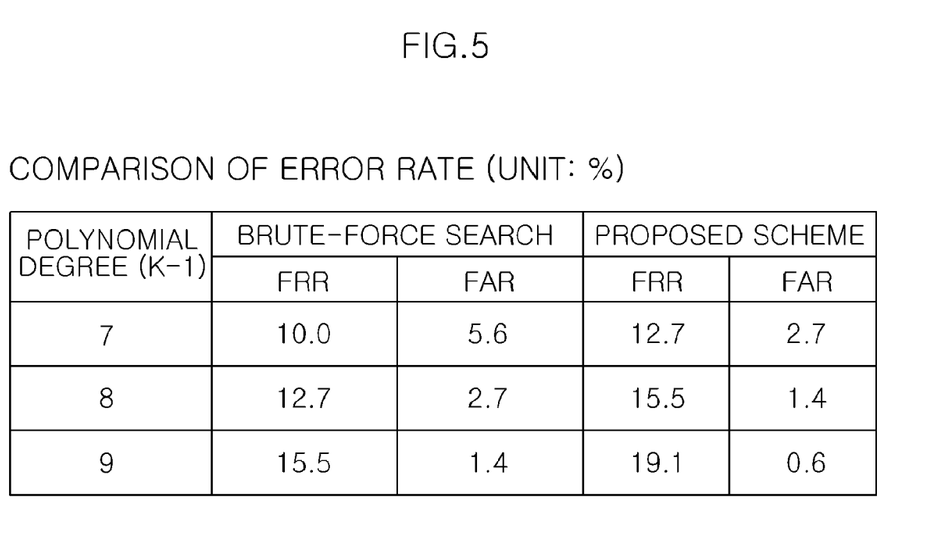
Figure 6:
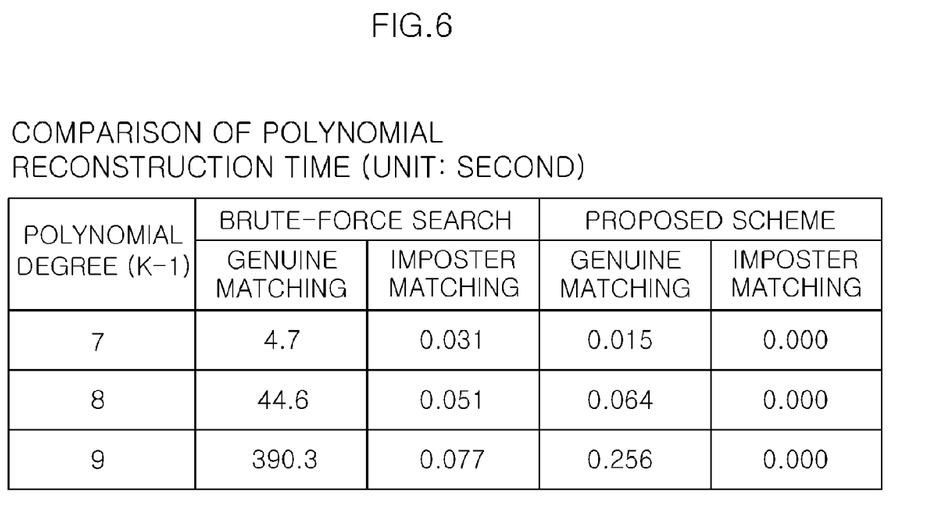

FIGS. 4 to 6 are tables for describing a performance of a method for polynomial reconstruction in a fuzzy vault system according to an exemplary embodiment of the present invention. FIG. 4 shows an average number of minutiae acquired by performing genuine matching and impostor matching, FIG. 5 shows an error rate of a brute-force search scheme and a proposed scheme, and FIG. 6 shows the average polynomial reconstruction time of the brute-force search scheme and the proposed scheme.

In the case of the genuine matching, matching was performed for each of eight fingerprint images and the remaining fingerprint images. Once a corresponding image was registered, the corresponding image was not used for subsequent matching. In the case of the impostor matching, only a first fingerprint image of each finger was used. Like the genuine matching, matching was performed for each of 100 fingerprint images and the remaining fingerprint images. Once a corresponding image was registered, the corresponding image was not used for subsequent matching. Accordingly, the genuine matching was performed a total of 2,800 times and the impostor matching was performed a total of 4,950 times.

When comparing the brute-force search scheme and the proposed scheme with reference to FIG. 5, the brute-force search scheme requires k real points and the proposed scheme requires (k+1) real points in order to reconstruct (k−1)-degree polynomial. Accordingly, the error rate of the brute-force search scheme using (k+1)-degree polynomial is the same as the error rate of the proposed scheme using k-degree polynomial.

Also, as the polynomial degree increases, a false reject rate (FRR) increases and a false accept rate (FAR) decreases.

Referring to FIG. 6, the genuine matching has a larger number of matching minutiae than the impostor matching and thus it takes long time to reconstruct the polynomial. As the polynomial degree increases, the reconstruction time also increases. Also, as the polynomial degree increases, a time decrease rate of the proposed scheme increases. In the proposed scheme, compared to the brute-force search scheme, 316 folds of time was decreased for 7-degree polynomial, 698 folds of time was decreased for 8-degree polynomial, and 1527 folds of time was decreased for 9-degree polynomial. Accordingly, the proposed scheme needs one more real point than the brute-force search, whereas the proposed scheme may perform real-time processing in an embedded system and the like as well as a PC.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves, such as data transmission through the Internet. The computer readable recording medium can also be distributed over network coupled computer systems so that the computer readable code is stored and executed in a distributed fashion.

It will be apparent to those skilled in the art that various modifications and changes may be made without departing from the scope and spirit of the present invention. Therefore, it should be understood that the above embodiments are not limitative, but illustrative in all aspects. The scope of the present invention is defined by the appended claims rather than by the description preceding them, and therefore all changes and modifications that fall within metes and bounds of the claims, or equivalents of such metes and bounds are therefore intended to be embraced by the claims.

What is claimed is:

1. An apparatus for polynomial reconstruction in a fuzzy vault system, the apparatus comprising:
    a minutiae selection unit receiving a set of matching minutiae to select a minutiae combination to be used for the polynomial reconstruction;
    a simultaneous equations generation unit generating simultaneous equations using the selected minutiae combination;
    a root decision unit determining whether a root of the simultaneous equations exists; and
    a reconstruction unit reconstructing the polynomial using the selected minutiae combination when the root of the simultaneous equations exists.

2. The apparatus of claim 1, wherein, when the root of the simultaneous equations does not exist, the minutiae selection unit reselects a minutiae combination to be used for the polynomial reconstruction.

3. The apparatus of claim 1, wherein, when selecting the minutiae combination to be used for the polynomial reconstruction, the minutiae selection unit selects the minutiae combination to have a larger number of minutiae than a degree of the polynomial by two.

4. The apparatus of claim 1, wherein the root decision unit generates an augmented matrix of the simultaneous equations and converts the augmented matrix to a row echelon form matrix to determine whether the root of the simultaneous equations exists based on a value of the last element of the last row of the row echelon form matrix.

5. A method for polynomial reconstruction in a fuzzy vault system, the method comprising:
    receiving a set of matching minutiae to select a minutiae combination to be used for the polynomial reconstruction;
    generating simultaneous equations using the selected minutiae combination;
    determining whether a root of the simultaneous equations exists; and
    reconstructing the polynomial using the selected minutiae combination when the root of the simultaneous equations exists.

6. The method of claim 5, further comprising:
    reselecting a minutiae combination to be used for the polynomial reconstruction, when the root of the simultaneous equations does not exist.

7. The method of claim 5, wherein, when selecting the minutiae combination to be used for the polynomial reconstruction, the selecting of the minutiae combination selects the minutiae combination to have a larger number of minutiae than a degree of the polynomial by two.

8. The method of claim 5, wherein the determining generates an augmented matrix of the simultaneous equations and converts the augmented matrix to a row echelon form matrix to determine whether the root of the simultaneous equations exists based on a value of the last element of the last row of the row echelon form matrix.

* * * * *